United States Patent [19]
Koyama et al.

[11] Patent Number: 5,215,803
[45] Date of Patent: Jun. 1, 1993

[54] MAGNETIC RECORDING MEDIUM

[75] Inventors: Noboru Koyama, Hino; Kazuyoshi Imai, Hachioji, both of Japan

[73] Assignee: Konica Corporation, Tokyo, Japan

[21] Appl. No.: 580,546

[22] Filed: Sep. 11, 1990

[30] Foreign Application Priority Data

Sep. 14, 1989 [JP] Japan ................................. 239176
Sep. 14, 1989 [JP] Japan ................................. 239178

[51] Int. Cl.⁵ .......................... B32B 3/10; B32B 5/16; G11B 5/66
[52] U.S. Cl. .................... 428/141; 428/333; 428/694 B; 428/900
[58] Field of Search ............... 428/141, 694, 900, 333

[56] References Cited

U.S. PATENT DOCUMENTS

| | | | |
|---|---|---|---|
| 4,735,844 | 4/1988 | Ide et al. | 428/141 |
| 4,828,903 | 5/1989 | Ejiri et al. | 428/141 |
| 4,847,147 | 7/1989 | Aonuma et al. | 428/694 |
| 4,992,330 | 2/1991 | Kawahara et al. | 428/329 |
| 5,035,856 | 7/1991 | Koyama et al. | 428/695 |

*Primary Examiner*—P. C. Sluby
*Assistant Examiner*—Leszek Kiliman
*Attorney, Agent, or Firm*—Finnegan, Henderson, Farabow, Garrett and Dunner

[57] ABSTRACT

There is disclosed a magnetic recording medium having improved output levels of electromagnetic conversion properties and reduced rubbing noise. The recording medium copmprises an uppermost magnetic layer and a lower magnetic layer, wherein a thickness of the uppermost layer is 0.1 to 1.0 μm; a coercive force of the total magnetic layers is 690 to 770 Oe; and a surface waviness of the uppermost layer is 0.015 μm or less.

11 Claims, 5 Drawing Sheets

CROSS SECTION CURVE

LOW FREQUENCY COMPONENT
( SURFACE WAVINESS CURVE )

FIG. 6
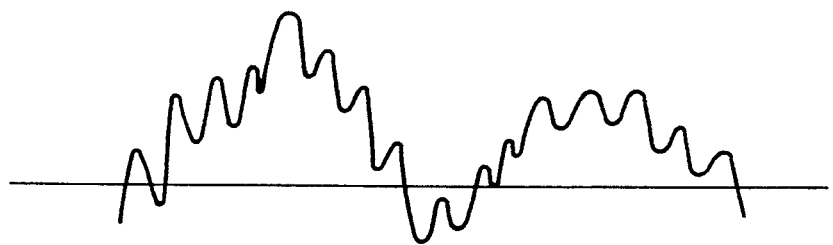
CROSS SECTION CURVE
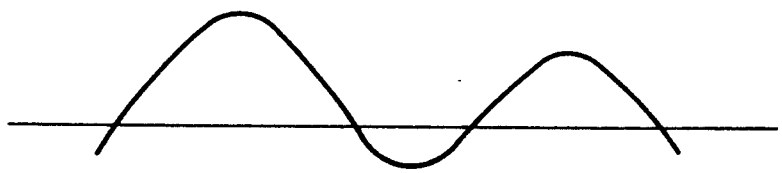
LOW FREQUENCY COMPONENT
(SURFACE WAVINESS CURVE)

MAGNETIC RECORDING MEDIUM

FIELD OF THE INVENTION

The present invention relates to a magnetic recording medium such as a magnetic tape, a magnetic sheet and a magnetic disc.

BACKGROUND OF THE INVENTION

Generally, a magnetic recording medium is prepared by coating on a support a magnetic paint comprising a magnetic powder and a binder resin, followed by drying. In conventional magnetic recording media comprising a single layer, a broad frequency region from low to high range must be covered by only one magnetic layer. Particularly in the recent trend toward high density recording where a higher recording performance and lower noise in a high frequency range are required, there is used a magnetic powder having a high Hc and a high BET value.

In this case, however, the characteristics in a lower frequency range are sometimes liable to be unsatisfactory.

The magnetic recording media for a video tape having plural magnetic layers in order to increase a recording capacity and balance the magnetic recording properties in both high and low frequency ranges are disclosed in Japanese Patent Publication Open to Public Inspection (hereinafter referred to as Japanese Patent O.P.I. Publication) Nos. 98803/1973, 172142/1984, 64901/1976, 56228/1983, 146211/1988, and Japanese Patent Examined Publication Nos. 2218/1957 and 12937/1981.

The magnetic recording media in which there is limited a coercive force (Hc) of a ferromagnetic powder contained in each of plural magnetic layers are disclosed in Japanese Patent O.P.I. Publication Nos. 56228/1983, 5623/1983 70429/1983 and 106333/1989. These conventional techniques, however, are not necessarily sufficient for providing required output over a wide frequency region from low to high range.

Other proposals are directed to the techniques in which surface roughness of a magnetic layer is made smoother or controlled to a prescribed level to decrease a spacing loss between a magnetic layer surface and a magnetic head for preventing deterioration of recording characteristics especially in a high frequency range and achieving excellent electromagnetic conversion properties, as disclosed in Japanese Patent O.P.I. Publication Nos. 168124/1986, 143522/1981, 143523/1981 and 150130/1982.

However, measures to merely reduce the surface roughness of a magnetic layer are liable to result in a larger friction coefficient which will generate rubbing noise when the recording medium contacts a magnetic head or run in a cassette deck. On the contrary, an increased surface roughness deteriorates electromagnetic conversion properties while it reduces rubbing noise.

BRIEF DESCRIPTION OF THE DRAWINGS

FIG. 6 is a schematic diagram for explaining an analytic method of surface geometry of a magnetic layer. Numbers used in these figures designate the following elements:

Figure 1:
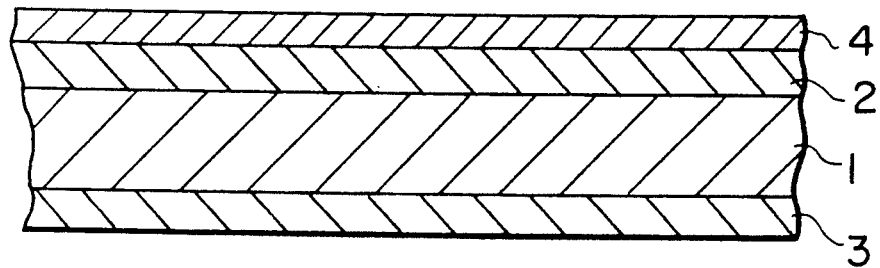
FIGS. 1 and 2 are cross sectional views of magnetic recording media.

1: a non-magnetic support
2: a lower magnetic layer
3: a backcoat layer
4, 6: upper magnetic layers
5: an intermediate magnetic layer

SUMMARY OF THE INVENTION

The object of the present invention is to provide a recording medium having an improved output level of electromagnetic conversion properties over a wide frequency region from low to high range with a reduced electrical noise as well as a minimized rubbing noise.

The above object can be attained by a magnetic recording medium comprising a non-magnetic support and provided thereon at least two magnetic layers in which a thickness of an uppermost magnetic layer is 0.1 μm to 1.0 μm and a coercive force (Hc) of the total magnetic layers ranges from 690 Oe to 770 Oe.

DETAILED DESCRIPTION OF THE INVENTION

In the invention, it has been found that the magnetic recording medium comprising at least two magnetic layers and having the above characteristics can improve an output level in a low to high frequency range to a large extent. The coersive force Hc of the total magnetic layers lower than 690 Oe is liable to cause an output drop in the overall frequency range, particularly in a high frequency range. Hc larger than 770 Oe tends to cause an output drop in a low frequency range. The thickness of the uppermost layer less than 0.1 μm results in Hc of the total magnetic layers lower than 690 Oe and the thickness more than 1.0 μm results in Hc higher than 770 Oe.

It is preferable that Hc of the total magnetic layers is 690 to 760 Oe and the thickness of the uppermost layer is 0.1 to 0.8 μm. It is more preferable that Hc is 690 to 750 Oe and the thickness is 0.1 to 0.6 μm.

Further, Hc of the uppermost layer is preferably larger than that of the lower magnetic layer. It is 750 Oe or more, preferably 780 to 1000 Oe. Hc of the lower layer is less than 750 Oe, preferably 680 to 740 Oe. The thickness of the lower layer is preferably 1.5 to 4.0 μm, more preferably 2.0 to 3.0 μm.

Further, in the invention, the surface waviness ($W_{CA}$) and the thickness of the uppermost layer are both key factors which affect the properties of a medium, and the relation therebetween is also very important. The surface waviness of the uppermost layer limited to 0.015 μm or can improve a surface property and thereby upgrade electromagnetic conversion properties; the thickness of the uppermost layer limited to 1.0 μm or less can improve the properties in a wide frequency range together with the functions of the lower layer and generates a proper surface roughness for lowering rubbing noise.

If the surface waviness ($W_{CA}$) is limited to 0.015 μm or less, a preferable surface property of the uppermost layer can be independently provided without being affected by a larger waviness of a non-magnetic support. This factor has not been well studied because of the thin uppermost layer (less than 1.0 μm) and is proposed for the first time by the invention. When a non-magnetic support has a large waviness, $W_{CA}$ of the uppermost layer can be controlled to 0.015 μm or less by forming a relatively thicker uppermost layer within the range of 1.0 μm or less with the thickness of the lower layer kept constant. When the non-magnetic support has a small waviness, the uppermost layer can be thinner to control $W_{CA}$ to 0.015 μm or less.

$W_{CA}$ is preferably 0.003 to 0.015 μm, more preferably 0.003 to 0.010 μm.

In the invention, the uppermost and lower layers are adjacent preferably to each other. There are sometimes the cases where instead of a clear boundary there exists a boundary region with a certain thickness, in which the magnetic powder of both layers coexist. In such cases, the boundary region is excluded from the uppermost layer and the lower layer. The recording medium of the invention is prepared preferably by the wet-on-wet coating method, but the wet-on-dry method in which the upper layer is coated on the dried lower layer may be also used.

The surface waviness ($W_{CA}$) in the invention is described below. A cross-sectional curve in the surface of a magnetic layer as shown in FIG. 1 can be divided into a low frequency component and a roughness component (a curve). A magnetic head of a video appliance can almost follow a surface waviness of a magnetic layer (a low frequency component). This waviness curve is obtained by removing a short wave component (a roughness component) and a long wave component from the cross-sectional curve and expressed by a center line waviness curve $y=f(X)$. According to JIS B0610-1987, the center line waviness $W_{CA}$ (μm) of a filtered wave which corresponds to the surface waviness $W_{CA}$ in the invention can be calculated by the following equation, provided that l is a length in which the waviness is measured:

$$W_{CA} = \frac{1}{l} \int_c^l |[f(x)]_c| dx$$

wherein $[f(X)]_c$ is the center line waviness curve of a filtered wave.

As a rule, the measurement length is at least three times the low-pass cut off value. In determining the above waviness curve, it is necessary to fix beforehand a wavelength (the cut off value) corresponding to a frequency in which a grain becomes a prescribed value (for example, 75%) when passed through a high-pass filter. The surface waviness of a non-magnetic support can also be expressed by the same $W_{CA}$ as the above.

In the invention, Hc of the total magnetic layers is a value measured for a finished magnetic recording medium, and Hc of each magnetic layer depends on that of magnetic powder used in each layer.

Figure 2:
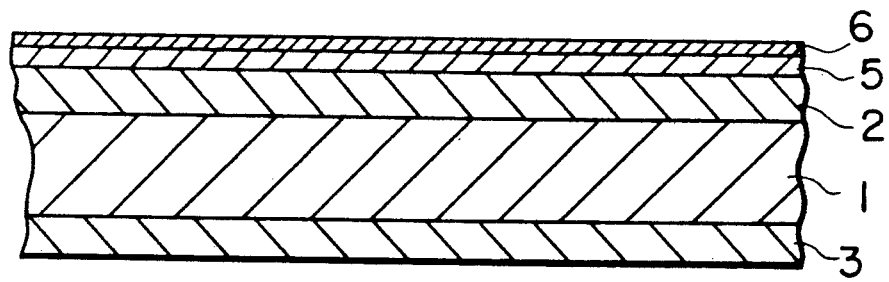

FIG. 1 shows one form of the magnetic recording medium of the invention, in which the lower magnetic layer 2 and the uppermost magnetic layer 4 are formed in this order on the non-magnetic support 1 made of polyethylene terephthalate, and a back coating layer 3 may be provided on the opposite side. An overcoating layer may be formed on the uppermost magnetic layer. FIG. 2 illustrates another form of the magnetic recording medium in which the upper layer is further divided into the layers 5 and 6.

In the magnetic recording media shown in FIGS. 1 and 2, the thickness of the lower magnetic layer 2 is preferably 1.5 to 4.0 μm, and the thickness of the uppermost layer 4 or the total thickness of the layers 5 and 6 is preferably 0.1 to 1.0 μm.

The examples of magnetic powder used in the invention are ferromagnetic powders including iron oxide magnetic powders such as $\gamma$-$Fe_2O_3$, Co-containing $\gamma$-$Fe_2O_3$, $Fe_3O_4$ and Co-containing $Fe_3O_4$; and magnetic metal powders such as Fe, Ni, Co, Fe-Ni-Co alloys, Fe-Ni alloys, Fe-Al alloys, Fe-Al-Ni alloys, Fe-Al-Co alloys, Fe-Mn-Zn alloys, Fe-Ni-Zn alloys, Fe-Al-Ni-Co alloys, Fe-Al-Ni-Cr alloys, Fe-Al-Co-Cr alloys, Fe-Co-Ni-Cr alloys, Fe-Co-Ni-P alloys and Co-Ni alloys.

Each magnetic layer may also contain various additives including lubricants such as silicone oil, graphite, molybdenum disulfide, tungsten disulfide, monobasic fatty acid having 12 to 20 carbon atoms (e.g., stearic acid) and fatty ester having 13 to 40 carbon atoms; abrasives such as fused alumina; and antistatic agents such as carbon black and graphite. Preferable binders used in the magnetic layers are polymers having an average molecular weight of 10,000 to 200,000, such as vinylchloride-vinylacetate copolymers, vinylchloride-vinylidene chloride copolymers, vinylchloride-acrylonitrile copolymers, polyvinyl chlorides, urethane resins, butadiene-acrylonitrile copolymers, polyamide resins, polyvinyl butyral, cellulose derivatives, styrene-butadiene copolymers, polyester resins, synthetic rubbers, phenol resins, epoxy resins, urea resins, melamine resins, phenoxy resins, silicone resins, acrylic reactive resins, mixtures of high molecular weight polyester resin and an isocyanate prepolymer, mixtures of polyester polyol and polyisocyanate, urea formaldehyde resins, and mixtures of low-molecular glycol/high-molecular diol/isocyanate. These are used either singly or in mixture.

It is preferred that these binder resins have a hydrophilic polar group such as —$SO_3M$, —COOM and —$PO(OM')_2$, wherein M represents hydrogen or an alkali metal such as lithium, potassium and sodium; and M' represents hydrogen, an alkali metal or a hydrocarbon residue. Such a polar group increases an affinity between a binder and magnetic powder, and an increased affinity improves dispersibility of the magnetic powder and prevents coagulation of the magnetic powder to thereby increase stability of a coating solution, which results in improving the durability of a magnetic recording medium.

The binder resin, particularly a vinyl chloride copolymer can be prepared by copolymerization of vinyl chloride monomer with copolymerizable monomer having an alkaline salt group of sulfonic acid or phosphoric acid and, if necessary, other copolymerizable monomers.

The metal for forming a salt with a sulfonic acid or phosphoric acid group is an alkaline metal such as sodium, potassium and lithium, preferably potassium in respect of solubility, reactivity and yield.

In case of providing the backcoating layer 3, the binder resin containing a non-magnetic powder such as barium sulfate is coated on the back side of a support.

Materials for the support 1 are plastics such as polyethylene terephthalate and polypropylene; metals such as Al and Zn; and ceramics such as glass, boron nitride, Si carbide, porcelain and earthware.

Figure 3:
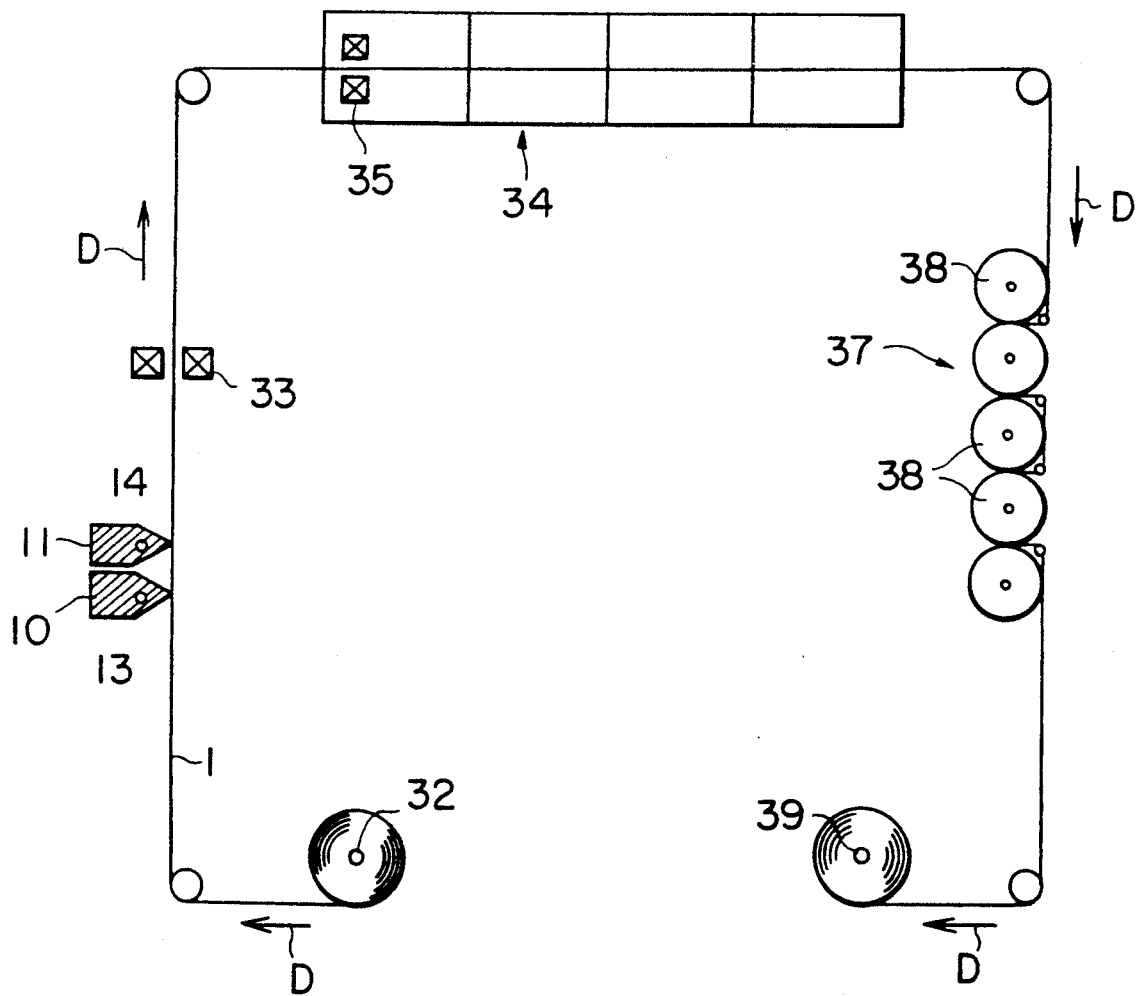
FIG. 3 is a schematic diagram of the manufacturing equipment of magnetic recording media.
Figure 4:
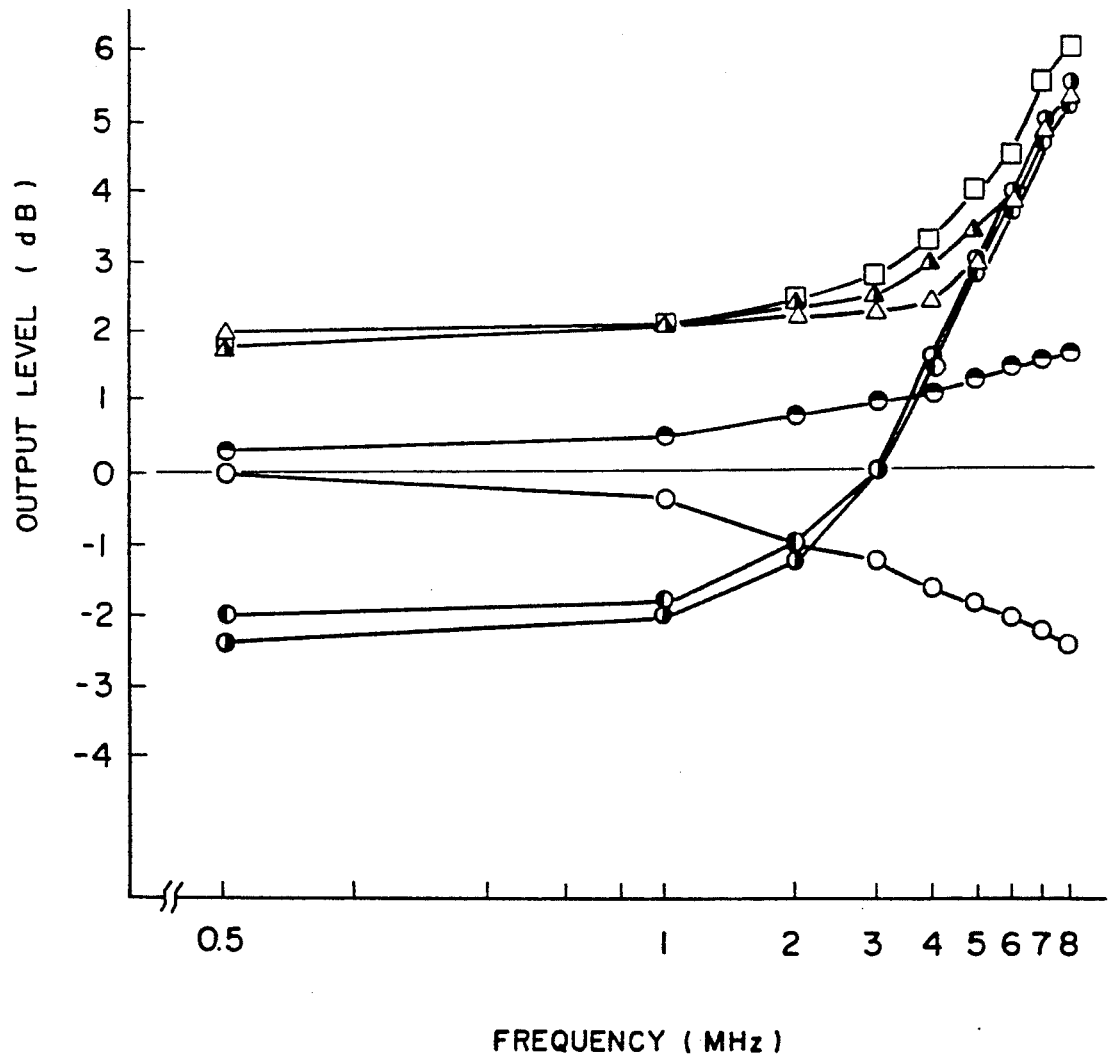
FIGS. 4 and 5 are graphic charts showing characteristics change when physical properties of each magnetic layer are varied.
Figure 5:
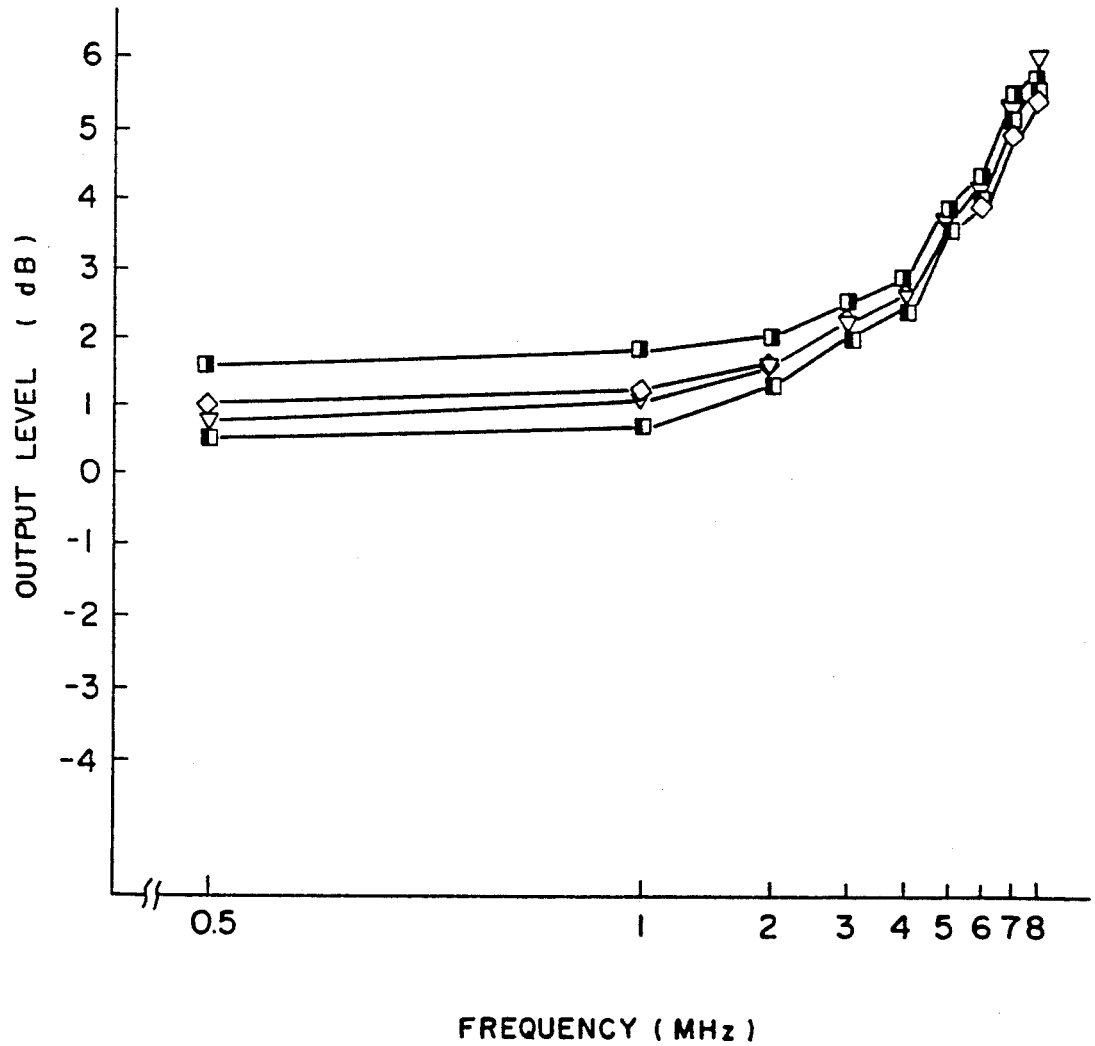

FIG. 3 shows one form of the equipment for preparing the magnetic recording medium.

The paints for the magnetic layers 2 and 4 are applied on the film support 1 fed from the feed roll 32 with the extrusion coaters 10 and 11. Then, the coated support is subjected to magnetic orientation by the pre-orientation magnet 33 of 2,000 gauss, and fed to the dryer 34 equipped with the post-orientation magnet 35 of 2,000 gauss, where the support is dried with hot air from upper and lower nozzles. The dried support 1 is then fed to the super calendering unit 37 consisting of a plurality of the calender rolls 38. After calendering, the support is rolled up with the roll 39. Each paint may be supplied to the coaters 10 and 11 via an unillustrated inline mixer. In this figure, the arrow D indicates the direction in which the support is carried. The extrusion coaters 10 and 11 are respectively equipped with the liquid reservoirs 13 and 14 to apply paints by the wet-on-wet method. The recording medium shown in FIG. 2 can be prepared with the same equipment having one more extrusion coater.

EXAMPLES

The present invention will be described in more detail with the following examples.

In the examples, the unit is parts by weight unless otherwise described.

EXAMPLE 1

The following compositions were kneaded and dispersed with a kneader and a sand mill to prepare the respective magnetic paints.

| | |
|---|---|
| Magnetic paint for the upper layer | 100 |
| Co-$\gamma$-Fe$_2$O$_3$ (Hc is shown in Table 1) | |
| $\alpha$-Al$_2$O$_3$ (average particle size: 0.2 m) | 5 |
| Vinyl chloride copolymer having potassium sulfate groups (MR 110 made by Nippon Zeon, Ltd.) | 10 |
| Polyurethane resin having sodium sulfate groups (UR 8300 made by Toyobo Co.) | 5 |
| Carbon black (average particle size: 40 m$\mu$) | 1 |
| Myristic acid | 1 |
| Stearic acid | 1 |
| Butyl stearate | 1 |
| Cyclohexanone | 100 |
| Methyl ethyl ketone | 100 |
| Toluene | 100 |

After kneading and dispersing the above magnetic paint components, 5 parts of Colonate L made by Nippon Polyurethane Ind. was added thereto to prepare the magnetic paint.

| | |
|---|---|
| Magnetic paint for the lower layer | 100 |
| Co-$\gamma$-Fe$_2$O$_3$ (Hc is shown in Table 1) | |
| Vinyl chloride copolymer having potassium sulfate groups (MR 110 made by Nippon Zeon, Ltd.) | 10 |
| Polyurethane resin having sodium sulfate groups (UR 8300 made by Toyobo Co.) | 5 |
| Myristic acid | 1 |
| Stearic acid | 1 |
| Butyl stearate | 1 |
| Cyclohexanone | 100 |
| Methyl ethyl ketone | 100 |
| Toluene | 100 |

After kneading and dispersing the above magnetic paint components, 5 parts of Colonate L was added thereto to prepare the magnetic paint.

Next, the magnetic paints for the upper and lower layers were coated simultaneously on a 14.5 $\mu$m thick polyethylene terephthalate base film with the equipment of FIG. 3, followed by orientation, drying and calendering. The dry thicknesses of the upper layer and the lower layer are shown in Table 1.

Then, the paint for the backcoating layer having the following composition was applied on the opposite side of the support to a dry thickness of 0.8 $\mu$m.

| | |
|---|---|
| Carbon black (Raven 1035) | 40 |
| Barium sulfate (average particle size: 300 m$\mu$m) | 10 |
| Nitrocellolose | 25 |
| N-2301 (made by Nippon Polyurethane Ind.) | 25 |
| Colonate L (made by Nippon Polyurethane Ind.) | 10 |
| Cyclohexanone | 400 |
| Methyl ethyl ketone | 250 |
| Toluene | 250 |

Thus, a wide magnetic film was prepared and rolled up. The film was then cut into ½ inch wide tapes to prepare video tape samples No. 1 to 11 having the characteristics shown in Table 1.

TABLE 1

| Sample No. | Hc (Oe) of ferromagnetic powder Upper layer | Hc (Oe) of ferromagnetic powder Lower layer | Layer thickness ($\mu$m) Upper layer | Layer thickness ($\mu$m) Lower layer | Hc (Oe) of total magnetic layers |
|---|---|---|---|---|---|
| 1 (Inv.) | 800 | 680 | 0.3 | 2.7 | 690 |
| 2 (Inv.) | 800 | 700 | 0.3 | 2.7 | 710 |
| 3 (Inv.) | 900 | 700 | 0.3 | 2.7 | 720 |
| 4 (Inv.) | 900 | 700 | 0.5 | 2.5 | 730 |
| 5 (Inv.) | 900 | 700 | 1.0 | 2.0 | 770 |
| 6 (Inv.) | 850 | 750 | 0.3 | 2.7 | 760 |
| 7 (Inv.) | 900 | 750 | 0.3 | 2.7 | 765 |
| 8 (Comp.) | — | 660 | — | 3.0 | 670 |
| 9 (Comp.) | 800 | 670 | 0.5 | 2.5 | 675 |
| 10 (Comp.) | 900 | — | 3.0 | — | 910 |
| 11 (Comp.) | 900 | 750 | 1.2 | 1.8 | 780 |

The following characteristics of each sample were evaluated, and the results are shown in Table 2. Further, the data of each sample are shown in graphs in Tables 4 and 5.

(1) Coercive force: measured with VSM III made by Toei Kogyo, Ltd.
(2) Output level: determined by the difference between a playback output of a record in a single frequency and that of reference tape, over a frequency range of 0.5 to 8.0 M Hz.

TABLE 2

| Sample No. | Output level (dB) 0.5 MHz | 1.0 MHz | 2.0 MHz | 3.0 MHz | 4.0 MHz | 5.0 MHz | 6.0 MHz | 7.0 MHz | 8.0 MHz |
|---|---|---|---|---|---|---|---|---|---|
| 1 (Inv.) | 2.0 | 2.1 | 2.2 | 2.3 | 2.5 | 3.0 | 3.9 | 4.9 | 5.4 |
| 2 (Inv.) | 1.8 | 2.0 | 2.3 | 2.5 | 3.0 | 3.5 | 3.9 | 4.8 | 5.5 |
| 3 (Inv.) | 1.8 | 2.0 | 2.5 | 2.8 | 3.3 | 4.0 | 4.5 | 5.5 | 6.7 |
| 4 (Inv.) | 1.6 | 1.8 | 2.0 | 2.5 | 2.7 | 3.8 | 4.3 | 5.4 | 5.8 |
| 5 (Inv.) | 0.5 | 0.7 | 1.3 | 2.0 | 2.4 | 3.6 | 4.1 | 5.2 | 5.6 |
| 6 (Inv.) | 1.0 | 1.2 | 1.6 | 2.2 | 2.6 | 3.6 | 3.9 | 4.9 | 5.4 |

TABLE 2-continued

| Sample No. | Output level (dB) | | | | | | | | |
|---|---|---|---|---|---|---|---|---|---|
| | 0.5 MHz | 1.0 MHz | 2.0 MHz | 3.0 MHz | 4.0 MHz | 5.0 MHz | 6.0 MHz | 7.0 MHz | 8.0 MHz |
| 7 (Inv.) | 0.8 | 1.1 | 1.5 | 2.1 | 2.5 | 3.6 | 4.2 | 5.4 | 5.9 |
| 8 (Comp.) | 0 | −0.4 | −1.0 | −1.2 | −1.6 | −1.8 | 2.0 | −2.2 | −2.4 |
| 9 (Comp.) | 0.3 | 0.5 | 0.8 | 1.0 | 1.1 | 1.3 | 1.5 | 1.6 | 1.7 |
| 10 (Comp.) | −2.4 | −2.0 | −1.2 | 0 | 1.6 | 3.0 | 4.0 | 5.0 | 5.5 |
| 11 (Comp.) | −2.0 | −1.8 | −1.0 | 0 | 1.5 | 2.8 | 3.8 | 4.7 | 5.2 |

It can be understood from the above results that the output levels from low to high frequency range can be improved in the inventitive Samples 1 to 7 in which Hc of the total magnetic layers is 690 to 770 Oe and the thickness of the uppermost layer is 0.1 to 1.0 μm. Contrary, the output level of the comparative Sample 8, in which Hc of the total magnetic layers is less than 690 Oe and the upper layer is not provided, decreases over the whole frequency range. In the comparative Sample 9, the output levels sharply decrease in a higher frequency range. As seen in the comparative Samples 11 and 12 in which Hc of the total magnetic layers exceeds 770 Oe and the upper layer thicknesses also exceed 1.0 μm, the output levels in a lower frequency range deteriorate to a large extent.

EXAMPLE 2

There were prepared the tape samples 12 and 13 each having a three-layered structure illustrated by FIG. 2 and the characteristics shown in Table 3. These samples were evaluated in the same manner as in Example 1. The results are shown in Table 4.

TABLES 3

| Sample No. | Hc (Oe) of ferromagnetic powder | | | Layer thickness (μm) | | | Hc (Oe) of total magnetic layers |
|---|---|---|---|---|---|---|---|
| | Upper layer | Intermediate layer | Lower layer | Upper layer | Intermediate layer | Lower layer | |
| 12 (Inv.) | 800 | 760 | 680 | 0.2 | 0.3 | 2.5 | 700 |
| 13 (Comp.) | 900 | 780 | 750 | 1.2 | 0.3 | 1.5 | 810 |

TABLE 4

| Sample No. | Output level (dB) | | | | | | | | |
|---|---|---|---|---|---|---|---|---|---|
| | 0.5 MHz | 1.0 MHz | 2.0 MHz | 3.0 MHz | 4.0 MHz | 5.0 MHz | 6.0 MHz | 7.0 MHz | 8.0 MHz |
| 12 (Inv.) | 2.0 | 2.2 | 2.3 | 2.4 | 2.6 | 3.1 | 4.0 | 5.0 | 5.4 |
| 13 (Comp.) | −2.0 | −1.9 | −1.1 | −0.1 | 1.4 | 2.7 | 3.7 | 4.6 | 5.2 |

As can be seen from the above results, the output levels of the inventive sample are more excellent than those of the comparative sample especially in the low frequency range.

EXAMPLE 3

The video tape samples No. 14 to 25 having the characteristics shown in Table 5 were prepared in the same manner as in Example 1.

TABLE 5

| Sample No. | Hc (Oe) of ferromagnetic powder | | Layer thickness (μm) | | Hc (Oe) of total magnetic layers | Surface waviness, $W_{CA}$ (μm) | Surface roughness, Ra (μm) | Base $W_{CA}$ (μm) |
|---|---|---|---|---|---|---|---|---|
| | Upper | Lower | Upper | Lower | | | | |
| 14 (Inv.) | 900 | 700 | 0.5 | 3.0 | 730 | 0.005 | 0.008 | 0.006 |
| 15 (Inv.) | 900 | 700 | 0.5 | 3.0 | 730 | 0.010 | 0.010 | 0.011 |
| 16 (Inv.) | 900 | 700 | 0.5 | 3.0 | 730 | 0.015 | 0.011 | 0.018 |
| 17 (Inv.) | 900 | 700 | 0.25 | 3.0 | 715 | 0.008 | 0.010 | 0.008 |
| 18 (Inv.) | 900 | 700 | 0.7 | 3.0 | 740 | 0.008 | 0.010 | 0.011 |
| 19 (Inv.) | 900 | 700 | 1.0 | 3.0 | 750 | 0.010 | 0.010 | 0.020 |
| 20 (Inv.) | 900 | 700 | 0.7 | 3.0 | 740 | 0.010 | 0.010 | 0.018 |
| 21 (Comp.) | 900 | — | 3.0 | — | 900 | 0.006 | 0.004 | 0.006 |
| 22 (Comp.) | 900 | — | 3.0 | — | 900 | 0.018 | 0.010 | 0.023 |
| 23 (Comp.) | — | 700 | — | 3.0 | 700 | 0.006 | 0.005 | 0.006 |
| 24 (Comp.) | — | 700 | — | 3.0 | 700 | 0.018 | 0.013 | 0.025 |

TABLE 5-continued

| Sample No. | Hc (Oe) of ferromagnetic powder | | Layer thickness (μm) | | Hc (Oe) of total magnetic layers | Surface waviness, $W_{CA}$ (μm) | Surface roughness, Ra (μm) | Base $W_{CA}$ (μm) |
|---|---|---|---|---|---|---|---|---|
| | Upper | Lower | Upper | Lower | | | | |
| 25 (Comp.) | 900 | 700 | 1.5 | 2.5 | 775 | 0.007 | 0.006 | 0.008 |

Note: Surface waviness was measured with a surface roughness and geometry tester Model Surcom 1500 made by Tokyo Seimitsu Ltd. with the cut off value set at 0.500 to 0.050 mm.

Note: Surface waviness was measured with a surface roughness and geometry tester Model Surcom 1500 made by Tokyo Seimitsu Ltd. with the cut off value set at 0.500 to 0.050 mm.

The following characteristics of each sample were evaluated.

| -continued | |
|---|---|
| Myristic acid, stearic acid and butyl stearate | 1 each |
| Cyclohexanone, methyl ethyl ketone and toluene | 100 each |
| Colonate L | 5 |

TABLE 6

| Sample No. | Hc (Oe) of ferromagnetic powder | | | Layer thickness (μm) | | | Hc (Oe) of total magnetic layers | Surface waviness $W_{CA}$ (μm) | Surface roughness Ra (μm) | Base $W_{CA}$ (μm) |
|---|---|---|---|---|---|---|---|---|---|---|
| | Upper layer | Intermediate layer | Lower layer | Upper layer | Intermediate layer | Lower layer | | | | |
| 26 (Inv.) | 900 | 800 | 700 | 0.2 | 0.3 | 3.0 | 720 | 0.005 | 0.008 | 0.006 |
| 27 (Inv.) | 900 | 800 | 700 | 0.2 | 0.3 | 3.0 | 720 | 0.010 | 0.010 | 0.011 |
| 28 (Inv.) | 900 | 800 | 700 | 0.2 | 0.3 | 3.0 | 720 | 0.015 | 0.011 | 0.018 |
| 29 (Comp.) | 900 | 800 | 700 | 1.2 | 0.3 | 2.0 | 780 | 0.010 | 0.010 | 0.011 |

RF out:
determined by the difference between an output level of a played-back 100% white signal and that of a reference tape.

Lumi S/N:
determined by the difference between a ratio of an output level to a noise level in a played-back 100% white signal and that of a reference tape.

Chroma out:
determined by the difference between an output level of a played-back 100% color signal and that of a reference tape.

Chroma AM:
determined by the difference between a ratio of an output level to a noise level in a played-back 100% color signal and that of a reference tape.

Rubbing noise:
determined by the difference between a noise measured after repeating ten times a playback of one minute and a system noise measured without running a tape; measurement was made at 20°±2° C. and 10±2% RH with the cover of VTR removed.

The evaluation results are shown in Table 7.

EXAMPLES 4

The three-layered video tape samples No. 26 to 29 having the characteristics shown in Table 6 were prepared in the same manner as in Example 2, wherein the paints for the upper and lower layers were the same as those used in Example 1 and the paint having the following composition was used for the intermediate layer:

| | |
|---|---|
| Co- -$Fe_2O_3$ (Hc: 800 Oe, BET: 30 m²/g) | 100 |
| Vinyl chloride copolymer having potassium sulfate groups | 10 |
| Polyester polyurethane having sodium sulfate groups | 5 |

Each sample was evaluated in the same manner as in Example 3 and the results are shown in Table 7.

TABLE 7

| Sample No. | RF-OUT | L-SF | C-OUT | C-AM | Rubbing noise |
|---|---|---|---|---|---|
| 14 (Inv.) | 3.1 | 2.6 | 0.7 | 2.6 | 2.0 |
| 15 (Inv.) | 2.9 | 2.4 | 0.7 | 2.0 | 1.5 |
| 16 (Inv.) | 2.7 | 2.2 | 0.7 | 1.7 | 1.0 |
| 17 (Inv.) | 2.8 | 2.4 | 1.0 | 2.5 | 1.5 |
| 18 (Inv.) | 2.9 | 2.5 | 0.5 | 2.0 | 1.5 |
| 19 (Inv.) | 3.0 | 2.5 | 0.3 | 1.6 | 1.5 |
| 20 (Inv.) | 2.8 | 2.5 | 0.5 | 1.8 | 1.5 |
| 21 (Comp.) | 3.5 | 3.0 | −1.5 | 0 | 6.0 |
| 22 (Comp.) | 3.0 | 2.5 | −1.5 | −1.0 | 1.5 |
| 23 (Comp.) | 0.5 | 0.5 | 1.0 | 3.0 | 5.0 |
| 24 (Comp.) | 0 | 0 | 0.7 | −0.5 | 1.0 |
| 25 (Comp.) | 3.2 | 2.8 | −1.2 | +0.2 | 4.5 |
| 26 (Inv.) | 3.0 | 2.5 | 1.0 | 2.9 | 2.0 |
| 27 (Inv.) | 2.8 | 2.3 | 1.0 | 2.3 | 1.5 |
| 28 (Inv.) | 2.6 | 2.1 | 1.0 | 2.0 | 1.0 |
| 29 (Comp.) | 2.9 | 2.3 | −1.0 | 0 | 1.5 |

The above evaluation results reveal that the surface waviness ($W_{CA}$) limited to 0.015 μm or less improves the surface properties and thereby provides good electromagnetic conversion properties particularly in a lower frequency region and that the thickness of the upper magnetic layer limited to 1.0 μm or less improves the properties over the entire frequency range together with the functions of the lower layer (the characteristics in a lower frequency range) and optimizes the surface properties of the upper layer to thereby lower rubbing noise.

What is claimed is:

1. A magnetic recording medium comprising a support and provided thereon at least two magnetic layers comprising ferromagnetic particles in a binder including an uppermost magnetic layer and a lower magnetic layer, wherein the thickness of the uppermost layer is 0.1 to 1.0 μm, and the surface waviness of the uppermost layer is 0.003 to 0.015 μm and the average coercive force of the total magnetic layers is 690 to 770 Oe.

2. The recording medium of claim 1, wherein the surface waviness is 0.003 to 0.010 μm.

3. The recording medium of claim 1, wherein the thickness of the uppermost layer is 0.1 to 0.8 μm and the coercive force of the total magnetic layers is 690 to 760 Oe.

4. The recording medium of claim 1, wherein the coercive force of the uppermost layer is larger than that of the lower layer.

5. The recording medium of claim 1, wherein the thickness of the lower layer is 1.5 to 4.0 μm.

6. The recording medium of claim 3, wherein the thickness is 0.1 to 0.6 μm and the coercive force is 690 to 750 Oe.

7. The recording medium of claim 4, wherein the coercive force of the uppermost layer is 750 Oe or more.

8. The recording medium of claim 4, wherein the coercive force of the lower layer is less than 750 Oe.

9. The recording medium of claim 5, wherein the thickness is 2.0 to 3.0 μm.

10. The recording medium of claim 7, wherein the coercive force is 780 to 1000 Oe.

11. The recording medium of claim 8, wherein the coercive force is 680 to 740 Oe.

* * * * *